US008743721B2

(12) United States Patent
Astely et al.

(10) Patent No.: US 8,743,721 B2
(45) Date of Patent: *Jun. 3, 2014

(54) METHODS AND DEVICES RELATING TO DOWNLINK ASSIGNMENTS

(75) Inventors: David Astely, Bromma (SE); Stefan Parkvall, Stockholm (SE); Robert Baldemair, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 256 days.

This patent is subject to a terminal disclaimer.

(21) Appl. No.: 13/251,639

(22) Filed: Oct. 3, 2011

(65) Prior Publication Data

US 2012/0020315 A1 Jan. 26, 2012

Related U.S. Application Data

(63) Continuation of application No. 12/366,286, filed on Feb. 5, 2009, now Pat. No. 8,072,911.

(60) Provisional application No. 61/026,601, filed on Feb. 6, 2008.

(51) Int. Cl.
*H04L 12/26* (2006.01)
*H04W 72/04* (2009.01)
*H04J 3/00* (2006.01)

(52) U.S. Cl.
USPC ............ 370/252; 370/280; 370/329; 370/341; 370/343; 370/431; 455/69; 455/450; 455/452.2; 714/748; 714/750

(58) Field of Classification Search
USPC ......... 370/280–281, 294–295, 328, 329, 330, 370/252, 335–336; 455/450
See application file for complete search history.

(56) References Cited

U.S. PATENT DOCUMENTS

| | | | |
|---|---|---|---|
| 6,901,063 B2 | 5/2005 | Vayanos et al. | |
| 7,116,651 B2 | 10/2006 | Hakkinen et al. | |
| 8,565,162 B2 * | 10/2013 | Tiirola et al. | 370/329 |
| 2002/0093918 A1 | 7/2002 | Kim et al. | |
| 2003/0067907 A1 | 4/2003 | Rezaiifar et al. | |
| 2003/0128681 A1 | 7/2003 | Rauschmayer | |
| 2003/0210688 A1 | 11/2003 | Basso et al. | |
| 2003/0214930 A1 * | 11/2003 | Fischer | 370/338 |
| 2004/0009767 A1 | 1/2004 | Lee et al. | |
| 2004/0203811 A1 | 10/2004 | Rudowicz | |

(Continued)

OTHER PUBLICATIONS

Nokia & Nokia Siemens Networks, "Multi-TTI Uplink Grants for TDD (FS1+FS2)." R1-074324, 3GPP TSG RAN WG1 #50bis Meeting. Oct. 8-12, 2007. Shanghai, China.

(Continued)

*Primary Examiner* — Candal Elpenord

(57) ABSTRACT

The invention relates to a method in a first communication device of receiving control information over a radio channel from a second communication device. The first communication device receives a subframe over the radio channel, and determines whether the subframe is a downlink subframe with downlink assignment intended for the first communication device by reading data in the subframe. That being the case, the first communication device decodes data within the subframe, and determines whether any data packet being sent from the second communication device before the subframe has been missed by analyzing an indicator associated to the subframe in the data. The indicator provides knowledge about previous downlink subframes with downlink assignment intended for the first communication device.

25 Claims, 10 Drawing Sheets

(56) References Cited

U.S. PATENT DOCUMENTS

| | | | |
|---|---|---|---|
| 2006/0268887 A1* | 11/2006 | Lu et al. | 370/394 |
| 2007/0019596 A1 | 1/2007 | Barriac et al. | |
| 2007/0211657 A1 | 9/2007 | McBeath et al. | |
| 2009/0129259 A1* | 5/2009 | Malladi et al. | 370/210 |
| 2009/0129317 A1* | 5/2009 | Che et al. | 370/328 |
| 2009/0196204 A1 | 8/2009 | Astely et al. | |

OTHER PUBLICATIONS

Nokia & Nokia Siemens Networks, "Multi-ACK transmission in PUCCH for TDD." 3GPP TSG RAN WG1 Meeting #51bis. R1-080316. Jan. 2008. Seville, Spain.
Ericsson, "HARQ operation in case of UL Power Limitation." 3GPP TSG-RAN WG2 #60. R2-074940. Nov. 5-9, 2007. Jeju Island, Korea.
Ericsson: "Details of ACK/NAK bundling for TDD". TSG-RAN WG1 #53. R1-082002. May 5-9, 2008. Kansas City, USA.
LG Electronics: "Bundled ACK/NACK in TDD". 3GPP TSG RAN WG1#53. R1-081815. May 5-9, 2008. Kansas City, USA.
LG Electronics: "Handling problem with uplink ACK/NACK bundling". 3GPP TSG RAN WG1 #52bis. R1-081256. Mar. 31-Apr. 4, 2008. Shenzhen, China.
Motorola, et al.: "ACK/NACK Bundling for TDD: Way Forward". R1-082168. Agenda: 7.1.2.
"Introduction of Downlink Assignment Index". 3GPP TSG-RAN1 Meeting #53. R1-082170. May 5-9, 2008. Kansas City, USA.
"Physical layer procedures (Release 8)". 3GPP TS 36.213, V8.4.0. (Sep. 2008).
"Multiplexing and channel coding (Release 8)". 3GPP TS 36.212 V8.4.0. (Sep. 2008).
ETSI TS 144 060 v7.11.0.
ETSI TS 145 002 v7.6.0. (Nov. 2007).
Qualcomm Europe: "UL control details for TDD". 3GPP TSG RAN1 #51bis. R1-080482. Jan. 14-18, 2008. Seville, Spain.
Ericsson: "Multiple ACL/NACK transmissions on PUCCH for TDD". TSG-RAN WG1 #51bis. R1-080344. Jan. 14-18, 2008. Seville, Spain.
"Draft Report of 3GPP RAN WG1 #51bis v0.1.0 (Sevilla, Spain, Jan. 14-18, 2008)". 3GPP TSG RAN WG1 Meeting #52. Feb. 11-15, 2008. Sorento, Italy.
Ericsson: "Combination of ACK/NACKs for TDD". TSG-RAN WG1 #52. R1-080870. Feb. 11-15, 2008. Sorrento, Italy.
Motorola: "UL ACK/NACK for TDD". 3GPP TSG RAN1#52. R1-080738. Feb. 11-15, 2008. Sorrento, Italy.
Ericsson, et al: "Multiple ACK/NAK for TDD". TSG-RAN WG1 #52. R1-081110. Feb. 11-15, 2008. Sorrento, Italy.
"Draft Report of 3GPP TSG RAN WG1 #52 v0.1.0 (Sorrento, Italy, Feb. 11-15, 2008)". 3GPP TSG RAN WG1 Meeting #52bis. Mar. 31-Apr. 4, 2008. Shenzhen, China.
Ericsson: "Details of ACK/NAK bundling for TDD". TSG-RAN WG1 #52bis. R1-081566. Mar. 31-Apr. 4, 2008. Shenzhen, China.
TD Tech, "ACK/NACK Multiplexing in PUSCH in TDD." 3GPP TSG RAN WG1#52bis. R1-081339. Mar. 31-Apr. 4, 2008. Shenzhen, China.
Nokia, et al: "Downlink scheduling for ACK/NACK bundling". 3GPP TSG RAN WG1 Meeting #52bis. R1-081452. Mar. 31-Apr. 4, 2008. Shenzhen, China.
Nokia Siemens Networks, et al: "UL/DL resource allocation signaling errors and their impact to UL multiplexing design". 3GPP TSG RAN WG1 Meeting #49. R1-072312. May 7-11, 2007. Kobe, Japan.
"Final Report of 3GPP TSG RAN WG1 #52bis v1.0.0 (Shenzhen, China, Mar. 31-Apr. 4, 2008)". 3GPP TSG RAN WG1 Meeting #53. R1-081711. May 5-9, 2008. Kansas City, USA.
"Final Report of 3GPP TSG RAN WG1 #53 v1.0.0 (Kansas City, USA, May 5-9, 2008)". 3GPP TSG RAN WG1 Meeting #53. May 5-9, 2008. Kansas City, USA.
Texas Instruments, et al: "Explicit DTX Signaling with ACK/NAK Bundling in TDD". 3GPP TSG RAN WG1 #52bis. R1-081373. Mar. 31-Apr. 4, 2008. Shenzhen, China.
Nokia Siemes Networks, Avoiding PUSCH Error Situations Caused by DL Allocation Grant Signalling Failure (FDD/TDD). 3GPP TSG RAN WG1 Meeting #5; R1-074880. Jeju, Korea. Nov. 5-9, 2007.
Nokia Siemes Networks. UL/DL Resource Allocation Signaling Errors and Their impact to UL Multiplexing Design, 3GPP TSG RAN WG1 Meeting #50; R1-073655. Athens, Greece, Aug. 20-24, 2007.
Ericsson: "Details of ACK/NAK bundling for TDD" 3GPP Draft; RI-082002, 3rd Generation Partnership Project (3GPP), Mobile Competence Centre ; 650, Route Des Lucioles : F-06921 Sophia-Antipolis Cedex : France, vol. tsg_ran\WGI_RLI\TSGRI_53\Docs. No. Kansas City, USA; 20080505, May 5, 2008, XP050110349 the whole document.
LG Electronics: "Bundled ACK/NACK in TOO" 3GPP Draft; RI-081815 TOO ACKNACK Bundling, 3rd Generation Partnership Project (3GPP), Mobile Competence Centre , 650, Route Des Lucioles ; F-06921 Sophia-Antipolis Cedex ; France, vol. tsg_ran\WGI_RLI\TSGRI_53\Docs. No. Kansas City, USA; 20080505, May 5, 2008, XP050110191 the whole document.
LG Electronics: "Handling problem with uplink ACK/NACK bundling" 3GPP Draft; RI-081256 US ACKNACK Bundling, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_52b\Docs. No. Shenzhen, China; 20080331, May 5, 2008, XP050109698 the whole document.

\* cited by examiner

Examples with K=2 k=0 k=0  k=1 k=0

Examples with K=3 k=0     k=1 k=0  k=1  k=2 k=0  k=1

METHODS AND DEVICES RELATING TO DOWNLINK ASSIGNMENTS

CROSS-REFERENCE TO RELATED APPLICATION

This application is a continuation of U.S. application Ser. No. 12/366,286, filed on Feb. 5, 2009 now U.S. Pat. No. 8,072,911, which claims the benefit of U.S. Provisional Application No. 61/026,601, filed on Feb. 6, 2008, the disclosure of which is incorporated herein by reference.

TECHNICAL FIELD

The present invention relates to methods and devices in a communications network. In particular, it relates to detection and handing of missed downlink assignments.

BACKGROUND

A key requirement on Long Term Evolution (LTE) for radio access as defined in 3GPP is frequency flexibility for transmissions between a radio base station and a mobile terminal over a radio link. For this purpose, carrier bandwidths between 1.4 MHz and 20 MHz are supported, as is both Frequency Division Duplex (FDD) and Time Division Duplex (TOD), so that both paired and unpaired frequency spectrum can be used. For FDD, the downlink (DL), i.e. the link from a base station to a mobile terminal, and uplink (UL), i.e. the link from a mobile terminal to a base station, use different frequencies so called "paired frequency spectrum" and can hence transmit simultaneously. For TDD, uplink and downlink use the same frequency "unpaired" frequency spectrum" and can not transmit simultaneously. Uplink and downlink can however share the time in a flexible way, and by allocating different amounts of time, such as the number of subframes of a radio frame, to uplink and downlink, it is possible to adapt to asymmetric traffic and resource needs in uplink and downlink.

The above asymmetry also leads to a significant difference between FDD and TDD. In LTE time is structured into radio frames of 10 ms duration, and each radio frame is further divided into 10 subframes of 1 ms each. Whereas for FDD, the same number of uplink and downlink subframes is available during a radio frame, for TDD the number of uplink and downlink subframes may be different. One of many consequences of this is that in FDD, a mobile terminal can always send feedback in response to a data packet in an uplink subframe subject to a certain fixed processing delay. In other words, every downlink subframe can be associated with a specific later uplink subframe for feedback generation in way that this association is one-to-one, i.e. to each uplink subframe is associated with exactly one downlink subframe. For TDD however, since the number of uplink and downlink subframes during a radio frame may be different, it is in general not possible to construct such a one-to-one association. For the typical case with more downlink subframes than uplink sub-frames, it is rather so that feedback from several downlink subframes requires to be transmitted in at least one of the uplink subframes.

In Evolved Universal Terrestrial Radio Access (E-UTRA), a radio frame of 10 ms duration is divided into ten subframes, wherein each subframe is 1 ms long. In case of TDD, a subframe is either a special subframe as described below or assigned to uplink or downlink, i.e., uplink and downlink transmission cannot occur at the same time. Furthermore, each 10 ms radio frame is divided into two half-frames of 5 ms duration where each half-frame consists of five subframes.

The first subframe of a radio frame is always allocated to downlink transmission. The second subframe is a special subframes and it is split into three special fields, a downlink part DwPTS, a Guard Period (GP) and an uplink part UpPTS, with a total duration of 1 ms.

UpPTS is, if so configured, used for transmissions of sounding reference signals in the uplink and, if so configured, used for reception of a shorter random access preamble. No data or control signalling can be transmitted in UpPTS.

GP is used to create a guard period between periods of downlink and uplink subframes and may be configured to have different lengths in order to avoid interference between uplink and downlink transmissions. The length is typically chosen based on the supported cell radius.

DwPTS is used for downlink transmission much like any other downlink subframe with the main difference that it has shorter duration.

Different allocations of the remaining subframes to uplink and downlink transmission are supported, both allocations with 5 ms periodicity in which the first and second half-frame have identical structure, and allocations with 10 ms periodicity for which the half-frames are organized differently. For certain configurations the entire second half-frame is assigned to downlink transmission. In case of 5 ms periodicity, the ratio between downlink and uplink may e.g. be 2/3, 3/2, 4/1 (regarding DwPTS as a full normal downlink subframes), etc. In case of 10 ms periodicity, the ratio between downlink and uplink may e.g. be 5/5, 7/3, 8/2, 9/1 etc.

In the downlink of E-UTRA, OFDM, Orthogonal frequency-division multiplexing, with a subcarrier spacing of 15 kHz is used. Depending on the configured cyclic prefix length, a 1 ms subframe contains either 12 or 14 OFDM symbols in time. The term resource block is also used to refer to the two-dimensional structure of all OFDM symbols within a half subframe, a slot, times 12 consecutive subcarriers in the frequency domain. The downlink part of the special subframe, DwPTS, has a variable duration, and can assume lengths of 3, 9, 10, 11 or 12 OFDM symbols for the case with normal cyclic prefix, and 3, 8, 9 or 10 symbols for the case with extended cyclic prefix.

In the uplink of E-UTRA, SC-FDMA, Single Carrier Frequency Division Multiple Access, also referred to as Discrete-Fourier-Transform (DFT)-pre-coded OFDM, is used. The underlying two-dimensional (time and frequency) numerology is the same in terms of subcarrier spacing, cyclic prefix lengths and number of OFDM symbols. The major difference is that modulated data symbols to be transmitted in certain OFDM symbols are subject to a DFT and the outputs of the DFT are mapped to the subcarriers.

In order to improve performance of transmission in both the downlink and uplink direction, LTE uses Hybrid Automatic Repeat Request (HARQ). The function of this mechanism for downlink transmission is discussed below.

The basic idea of HARQ is that after receiving data in a (part of a) downlink subframe the terminal attempts to decode it and then reports to the base station whether the decoding was successful (ACK, acknowledgement) or not (NAK, negative acknowledgement). In case of an unsuccessful decoding attempt the base station thus receives a NAK in a later uplink subframe, and can retransmit the erroneously received data.

Downlink transmissions can be dynamically scheduled, i.e. in each downlink subframe the base station transmits control information on which terminals are to receive data and upon which resources in the current downlink subframe.

Such a control information message to a terminal is referred to as a downlink assignment. A downlink assignment thus contains information to which terminal the assignment is intended to and also information to the intended terminal about in which resources, for example how many and which resource blocks, data will be sent, and also information necessary for the terminal to decode the subsequent data, such as modulation and coding scheme. Resources here comprise some set of resource blocks. This control signalling is transmitted in the first 1, 2, 3 or 4 OFDM symbols in each subframe and data is sent in the remaining part of the subframe. The data sent to a terminal in a single downlink subframe is referred to a transport block and an ACK/NAK is sent in response to the transmission.

A terminal will thus listen to the control channels in the downlink subframes, and if it detects a downlink assignment addressed to itself, it will try to decode the subsequent data. It will also generate feedback in response to the transmission, in the form of an ACK or a NAK depending on whether the data transport block was decoded correctly or not. Furthermore, from the control channel resources on which the assignment was transmitted by the base station, the terminal can determine the corresponding uplink control channel resource. Hence, a downlink control channel is associated with an uplink control channel resource, and on a downlink control channel, a downlink assignment can be transmitted. In each DL subframe, several control channels may be transmitted and hence several users may get assigned data in uplink and downlink. Additionally, a UE may listen to several control channels.

For E-UTRAN FDD the terminal will in response to a detected downlink assignment in subframe n attempt to decode the transport block(s) sent to the terminal in subframe n and send an ACK/NAK report in uplink subframe n+4. For the case with so-called Multiple Input Multiple Outout (MIMO) multi-layer transmission, two transport blocks are transmitted in a single downlink subframe, and the terminal will respond with two ACK/NAK reports in the corresponding uplink subframe.

The assignment of resources to the terminals is handled by the scheduler, which takes into account traffic and radio conditions so as to use the resources efficiently while also meeting delay and rate requirements. Scheduling and control signaling may be done on a subframe to subframe basis. Typically, each downlink subframe is scheduled independently of others.

As described above, the first step for a terminal to receive data from the base station in a downlink subframe is to detect a downlink assignment in the control field of a downlink subframe. In the case that the base station sends such an assignment but the terminal fails to decode it, the terminal obviously cannot know that is was scheduled and will hence not respond with an ACK/NAK in the uplink. This situation is referred to as a missed downlink assignment. If the absence of an ACK/NAK can be detected by the base station, it can take this into account for subsequent retransmissions. Typically the base station should at least retransmit the missing packet, but it may also adjust some other transmission parameters.

Since downlink assignments can be given independently across downlink subframes, a terminal may be assigned downlink transmissions in multiple downlink subframes that are all to be acknowledged in a single uplink subframe. Hence, the uplink control signalling needs to support, in some way, feedback of ACK/NAKs for downlink transmissions in multiple downlink subframes from a terminal in a given uplink subframe.

One way is to allow the terminal to transmit multiple individual (for each downlink transmission in each downlink subframe) ACK/NAK bits in a single uplink subframe. Such protocols have however worse coverage than transmission of a one or two ACK/NAK reports. To improve control signaling coverage and capacity, it is possible to perform some form of compression, or bundling, of ACK/NAKs, referred to as ACK/NAK bundling. This means that all ACK/NAKs that are to be sent in a given uplink subframe are combined into a smaller number of bits, such as a single ACK/NAK report. As an example, the terminal can transmit an ACK only if the transport blocks of all the downlink subframes were received correctly and hence to be acknowledged. In any other case, meaning that at a NAK for at least one downlink subframe is to be transmitted, a combined NAK is sent for all downlink subframes. As described above, to each uplink subframe in TDD a set of downlink subframes can be associated rather than a single subframe as in FDD, for which downlink transmissions are to be given ACK/NAK response in the given uplink subframe. In the context of bundling this set is often referred to as the bundling window.

Another advantage of bundling is that it allows reusing the same control channel signaling formats as for FDD, independently of the TDD uplink/downlink asymmetry. The disadvantage is a possibly small loss in downlink efficiency. If the base station receives a NAK it cannot know how many and which downlink subframes were received erroneously and which were received correctly. Hence it may need to retransmit all of them.

A problem with ACK/NAK bundling is that a terminal may miss a downlink assignment, which may not be indicated in the bundled response. For instance, assume that the terminal was scheduled in two consecutive downlink subframes. In the first subframe the terminal misses the scheduling downlink assignment and will not be aware that it was scheduled, while in the second subframe it did successfully receive the data. The terminal will, as a result, transmit an ACK, which the base station will assume holds for both subframes, including data in subframe the terminal was not aware of. As a result, data will be lost. The lost data needs to be handled by higher-layer protocols, which typically takes a longer time than HARQ retransmissions and is less efficient. In fact, a terminal will not transmit any ACK/NAK in a given uplink subframe only if it missed every downlink assignment that was sent during the bundling window associated with the uplink subframe.

Thus, a missed downlink assignment will in general result in block errors that need to be corrected by higher-layer protocols, which in turn has a negative impact on performance in terms of throughput and latency. Also, increasing the delay may cause undesirable interactions with TCP based applications.

SUMMARY

It is therefore an object of embodiments herein to handle and/or to enable the detection of missed downlink assignments.

Embodiments herein disclose a method in a first communication device for receiving control information and data over a radio channel from a second communication device. The first communication device receives at least part of a subframe over the radio channel and detects whether the subframe is a subframe with a downlink assignment intended for the first communication device.

That being the case, the first communication device determines whether at least one downlink assignment for data being sent from the second communication device before the subframe has been missed by analysing an indicator associated to the subframe. The indicator providing knowledge about previous downlink subframes with downlink assignments intended for the first communication device, for example, to providing information indicating number of previous subframes with downlink assignment intended for the first communication device. Furthermore, the first communication device may also decode data within the subframe but if the first communication device detects that a previous subframe has been missed (or that a previous subframe has failed to decode) it may not need to attempt decoding since the first communication device knows that the response to be generated is a NAK or not respond at all, Discontinuous Transmission DTX.

In order to perform the method a first communication device is provided for receiving control information and data over a radio channel from a second communication device. The first communication device comprises a receiving arrangement 103 adapted to receive a subframe of a radio frame, and a control unit 101 arranged to determine whether the subframe is a subframe with downlink assignment intended for the first communication device That being the case, the control unit 101 is further arranged to determine whether any downlink assignment for data, that has been scheduled in and sent from the second communication device previous the subframe, has been missed by analysing an indicator associated to the subframe. The indicator is arranged to provide knowledge of previous subframe with downlink assignments intended for the first communication device.

Some embodiments disclose a method in a second communication device for transmitting control information and data over a radio channel to a first communication device in a subframe with a downlink assignment intended for the first communication device.

The second communication device adds an indicator to the subframe providing knowledge about previous subframes with a downlink assignment intended for the first communication device in the control information, and transmits the control information and data with the subframe to the first communication device.

In order to perform the method a second communication device is provided for transmitting control information and data with a subframe comprising a downlink assignment intended for a first communication device of a radio frame over a radio channel to the first communication device. The second communication device comprises a control unit arranged to add an indicator to the subframe arranged to provide knowledge of previous subframes with a downlink assignment intended for the first communication device in the control information, and a transmitting arrangement arranged to transmit the control information and data with the subframe to the first communication device.

If the first communication device, for example; a (mobile) terminal, misses a downlink assignment sent within a set of downlink subframes associated with the same uplink subframe, referred to as the bundling window, it will notice this since the signalled downlink assignment in each downlink subframe comprises knowledge about assignments in previous subframes within the bundling window, i.e. the detection of missed downlink assignment is improved. And, in some embodiments, if the terminal selects the control channel resource associated with the last subframe with a detected assignment, it will in a way signal to the base station which was the last received DL subframe. In this way, the second communication device, for example, a base station, can detect if the terminal missed any assignments in the end, since the terminal will use the "wrong" resource, i.e. a resource not associated with what the base station knows was the last subframe with an assignment. Embodiments reduce the probability that in case a downlink assignment is missed the transmission is acknowledged as successfully received.

BRIEF DESCRIPTION OF THE DRAWINGS

Embodiments will now be described in more detail in relation to the enclosed drawings, in which.

DETAILED DESCRIPTION OF EMBODIMENTS

Briefly described the present solution may be summarized in the following way: A base station, such as an eNodeB, a NodeB and/or the like, when sending a data packet comprised in a bundling window to a mobile terminal, at the same time provides knowledge, i.e. information to a user equipment, such as a mobile terminal and/or the like, about previous subframes within a bundling window that have been scheduled to be transmitted to the mobile terminal. In that way the mobile terminal can establish whether an assignment in any subframe preceding a subframe in which an assignment has been detected has been missed. Since the terminal may miss assignments at the end of subframe, it may select the control channel resource associated with the last DL subframes in which an assignment has been detected. This makes it possible for the base station to detect if the terminal has missed assignments in the end of the so called bundling window.

Embodiments relate to a method in a second communication device, and a second communication device adapted to perform said method, for providing knowledge to a first communication device about previous scheduling assignments within a set of subframes associated with a single UL subframe. Embodiments also relate to a method in a first communication device, and a first communication device adapted to perform said method, for using the uplink control channel associated with last DL subframes in which a DL scheduling assignment is detected. With said knowledge, the first communication device appropriately transmits ACK/NAK. In the example above, if the first communication device knew in the second subframe that it was supposed to receive data in the first subframe, it would signal NAK instead of ACK on the resource associated with the control channel in the second subframe, or possibly not respond at all to convey that an assignment has been missed. In the example above, if the terminal is assigned resources in two consecutive subframes, and misses the second assignment, the base station can detect that the terminal has missed the second assignment since the terminal responds on the resource associated with the first subframe rather than the second subframe.

Figure 1:
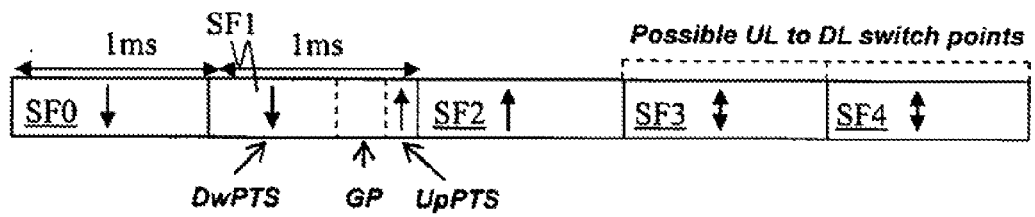
FIG. 1 shows a half radio frame in E-UTRAN.

FIG. 1 illustrates a half radio frame in E-UTRAN. A radio frame of E-UTRAN of 10 ms duration is divided into ten subframes SFs, wherein each subframe is 1 ms long. Each 10 ms radio frame is divided into two half-frames of 5 ms duration where each half-frame consists of five subframes, SF0-SF4. In case of TDD, a subframe is either a special subframe or assigned to uplink ↑ or downlink ↓, i.e., uplink and downlink transmission cannot occur at the same time. In the illustrated half radio frame, subframes SF2 or SF2 and SF3; or SF2, SF3 and SF4 can be assigned for uplink transmission.

The first subframe SF0 is always allocated to DL transmission. The second subframe SF1 is a special subframe which is split into three special fields, a downlink part DwPTS, Guard Period (GP) and an uplink part UpPTS, with a total duration of 1 ms.

DwPTS is used for downlink transmission much like any other downlink subframe with the difference that it has shorter duration. In the context of the present invention DwPTS of the special subframe may be regarded as normal a downlink subframe GP is used to create a guard period between periods of downlink and uplink subframes and may be configured to have different lengths in order to avoid interference between uplink and downlink transmissions and is typically chosen based on the cell radius.

UpPTS is used for uplink sounding reference signals and, if so configured, reception of a shorter random access preamble. No data or control signalling can be transmitted in UpPTS.

Different allocations of the remaining subframes to uplink and downlink transmission are supported, both allocations with 5 ms periodicity in which the first and second half-frame have identical structure, and allocations with 10 ms periodicity for which the half-frames are organized differently. For certain configurations the entire second half-frame is assigned to downlink transmission. Currently supported configurations use 5 ms or 10 ms periodicity.

Figure 2:
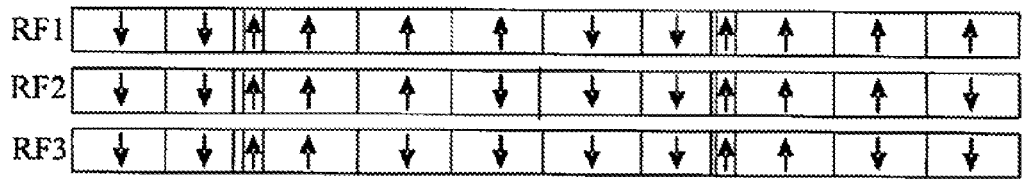
FIG. 2 shows examples of radio frames with configurations that use of 5 ms periodicity.

FIG. 2 shows examples of radio frames with configurations that use of 5 ms periodicity. RF1 comprises a configuration of 2DL (including DwPTS) and 3UL (neglecting UpPTS), that is, the ratio between downlink and uplink is 2/3. Similarly, RF2 comprises a configuration of 3DL and 2UL, that is, the ratio between downlink and uplink is 3/2. RF3 comprises a configuration of 4DL and 1UL, that is, the ratio between downlink and uplink is 4/1.

Figure 3:
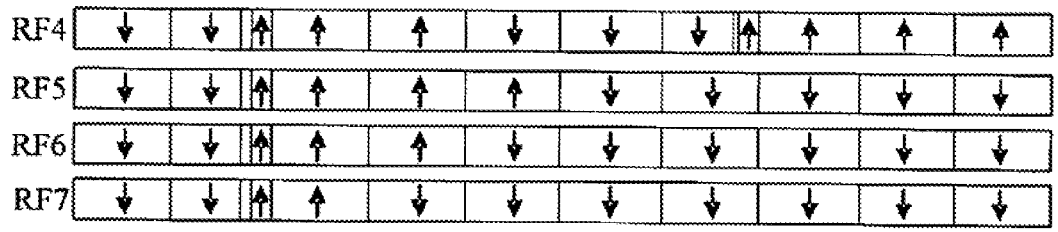
FIG. 3 shows examples of radio frames with configurations that use of 10 ms periodicity.

FIG. 3 shows examples of radio frames with configurations that use of 10 ms periodicity. RF4 comprises a configuration of 5DL and 5UL, that is, the ratio between downlink and uplink is 1/1. RF5 comprises a configuration of 7DL and 3UL, that is, the ratio between downlink and uplink is 7/3. RF6 comprises a configuration of 8DL and 2UL, that is, the ratio between downlink and uplink is 8/2. RF7 comprises a configuration of 9DL and 1UL, that is, the ratio between downlink and uplink is 9/1.

Figure 4:
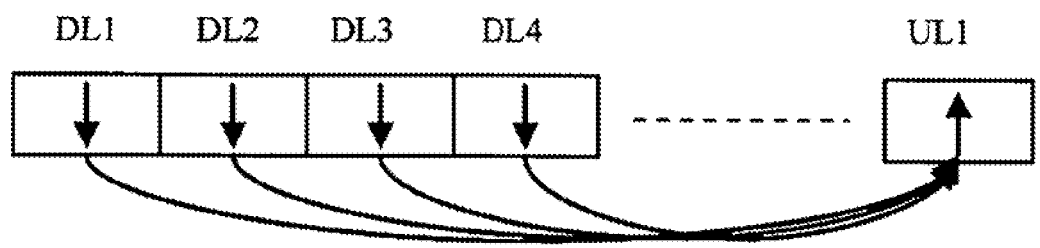
FIG. 4 shows an example of associating multiple downlink subframes with a single uplink subframes for ACK/NAKs feedback.
Figure 6:
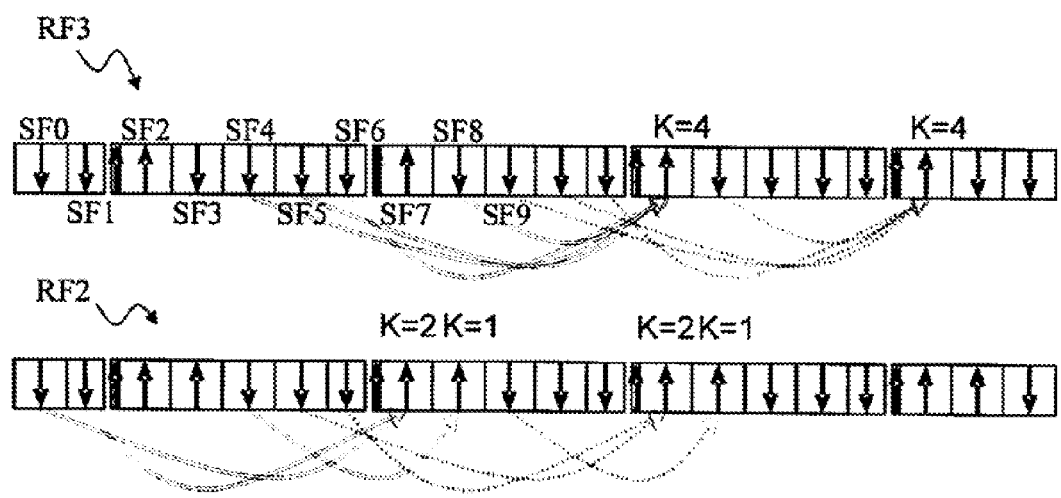
FIG. 6 illustrates different uplink (UL): downlink (DL) allocations as an example for how bundling windows can be defined.

FIG. 4 shows an example of bundling of ACK/NAKs from assigned DL subframes into a single ACK/NAK report in an UL subframe. As stated above, ACK/NAKs in response to downlink assignment in subframe n are reported in subframe n+k with k>3. That is, in the illustrated example ACK/NAKs of DL1-DL4 is reported an UL subframe being at the earliest subframe eight. For a given uplink subframe, the number of associated downlink subframes depends on the configuration of subframes to uplink and downlink, and can be different for different uplink subframes (as shown in FIG. 6).

Since downlink assignments can be given independently across downlink subframes, a terminal may be assigned downlink transmissions in multiple downlink subframes that are all to be acknowledged in the same single uplink subframe. Hence the uplink control signalling needs to support, in some way ACK/NAK feedback for downlink transmissions in multiple DL subframes from a terminal in a single given uplink subframe.

For FDD a terminal can always respond to a downlink data transmission with an ACK/NAK after a fixed delay of 4 subframes, while for TDD there is in general not a one-to-one relation between uplink and downlink subframes. This was discussed above. Thus the terminal cannot always send an ACK/NAK in response to a downlink assignment in subframe n in uplink subframe n+4, since this subframe may not be allocated to uplink transmission. Instead, each downlink subframe may be associated with a certain uplink subframe subject to a minimum processing delay, meaning that ACK/NAKs in response to downlink transmissions in subframe n are reported in subframe n+k with k>3. Furthermore, in a radio frame, if the number of downlink subframes is larger than the number of uplink subframes, ACK/NAKs in response to assigned data transmissions in multiple downlink subframes may need to be sent in a single uplink subframe. For a given uplink subframe, the number of associated downlink subframes depends on the configuration of subframes to uplink and downlink, and can be different for different uplink subframes. In addition, for FDD, there is a set of control channel resources in an uplink subframe that can be associated with the downlink control channels in the corresponding downlink subframes in a one-to-one fashion. For TDD, a similar set of feedback resources need to reserved for each DL subframe within the set of associated subframes. Hence, for TDD, there is thus more control channel resources in an uplink subframe, and each control channel in each downlink subframe can be associated with an uplink control channel resource in a one-to-one fashion.

Figure 5:
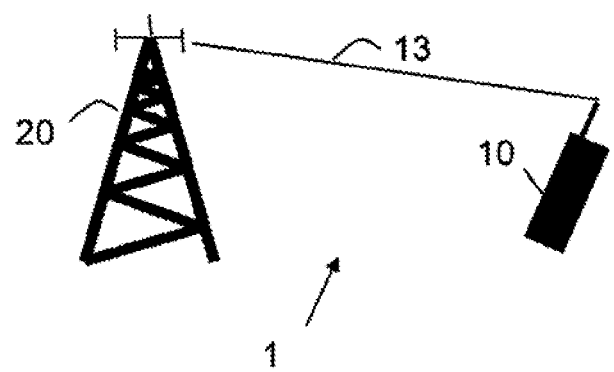
FIG. 5 depicts a schematic overview of a wireless telecommunication system.

FIG. 5 depicts a wireless telecommunication system 1, such as the E-UTRAN, (also known as LTE). The telecommunication system 1 uses TDD and comprises a mobile terminal 10, a first communication device and a base station 20, a second communication device, adapted to communicate with each other over a radio channel 13 in which TDD is used to separate transmissions in the two directions. The base station 20 may be a NodeB, an eNodeB or any other network unit capable to communicate with a mobile terminal over a radio channel. The mobile terminal 10 may be a mobile phone, a Personal Digital Assistant (PDA), a user equipment (UE) or any other network unit capable to communicate with a base station over a radio channel using TDD. It should, however, be understood that the terminology such as base station and mobile terminal should be considering non-limiting and does in particular not imply a certain hierarchical relation between the two; in general "base station" could be considered as the first communication device 10 and mobile terminal the second communication device 20, and these two devices communicate with each other over some radio channel. It should also be understood that the invention is not limited to TDD, but also half duplex FDD or FDD where similar transmissions as in TDD are possible.

The system 1 uses HARQ and ACK/NAK bundling for transmission of transport blocks of data in subframes over a radio channel. Associated with an uplink subframe, there may be zero, one or more than one downlink subframe. The set of downlink subframes associated with an uplink subframe is referred to as a bundling window, and different uplink subframes may have different bundling window sizes. In each bundling window, data in the form of transport blocks are to be transmitted in one or several downlink subframes to the mobile terminal 10. These packets may be stored in a buffer in the base station, and then transmitted one by one to the mobile terminal 10. A packet is not removed from the buffer until the base station 20 has received an acknowledgement that the mobile terminal 10 has correctly detected and decoded the specific data packet, or a maximum number of retransmissions are performed, or a predetermined time period has lapsed. If no acknowledgement is received from the mobile terminal 10, the base station 20 typically retransmits the non-acknowledged data packets until they have been acknowledged by the mobile terminal 10 or until a pre-determined period expires, and then deletes the data packets.

To enable the possibility to detect a missed DL assignment at the mobile terminal 10, the base station 20 signals, e.g. as part of a scheduling command, that is the DL assignment, to the mobile terminal 10, knowledge about previous assignments. The present invention also relates to use the uplink control channel associated with last subframe in which a DL scheduling assignment is detected to further enable the detection of missed DL assignments at the base station. With said knowledge, the mobile terminal 10 can appropriately transmit ACK/NAK or nothing. For example, if the mobile terminal 10 reads control information of an assigned DL indicating that it is the second assigned DL and the mobile terminal has not detected a first DL assignment, the mobile terminal may transmit a NAK or not respond at all to the bundle of assigned DLs to reduce the probability that the base station detects the transmission as successfully acknowledged.

Hence, if the mobile terminal misses (fails to detect) one or more downlink assignments within a bundling window, it will be able to determine this by looking at the assignments it did detect. Only if a terminal misses every downlink assignment within a bundling window, the miss(es), or if it misses assignments at the end of the bundling window, this will go by unnoticed by the terminal. Furthermore, since the terminal uses the resource associated with the last subframes in which an assignment is detected, the base station can detect if the terminal has missed assignments in any of the subframes after the last subframe in which an assignment is detected.

FIG. 6 illustrates different uplink (UL): downlink (DL) configurations as an example for how bundling windows are defined. Uplink subframes is illustrated with an upward directed arrow, downlink subframes is illustrated with an downward directed arrow, and DwPTS, GP UpPTS subframes comprises both a downward directed arrow and an upward directed arrow in FIG. 6. In the examples, the number of associated downlink subframes, K, is different for different uplink subframes as well as for different asymmetries. A first radio frame RF3 is shown comprising ten subframes SF0-SF9 wherein the configuration is done with a 5 ms periodicity. For the 4DL:1UL configuration in the radio frame eight RF3, the uplink subframe UL1 in each half frame is associated with four downlink subframes (K=4) and in order to have at least 3 ms between last received and the UL, DLs SF4-SF6 and SF8 are reported in an SF2 allocated to UL. Similarly, DLs SF9, SF0, SF1 and SF3 are reported in an SF7 allocated to UL.

For the 3DL:2UL configuration in radio frame eight RF2, the first uplink subframe in each half frame is associated to two downlink subframes (K=2), while the second is associated with a single DL subframe (K=1).

Referring to FIG. 6, each DL control channel which may carry a DL assignment in each DL subframe is associated with a certain UL control channel resource.

Considering the case when ACK/NAKs from K DL subframes are to be bundled into a single UL subframe and number the DL subframe 1 to m. In DL subframe n, the base station signals (as part of the scheduling command) to the terminal the number of previously scheduled DL subframes. In DL subframe m the maximum number of possible subframes previously scheduled is m−1.

To be a bit more specific, in the first DL subframe, m=1, of the bundling window there can not be any previously scheduled subframes. In the second DL subframe, m=2, of the bundling window there can be no or 1 previously scheduled subframe. In the third DL subframe, m=3, of the bundling window there can be 0, 1 or 2 previously scheduled subframes and so on. Alternatively, not the number of previously scheduled DL subframes is signaled but the number of the last subframe that was scheduled to the UE.

The subframe numbering may be restarted in several ways, such as

At the beginning of a radio frame or half frame.

at the beginning of each group of DL subframes, referred to as bundling window

For a case with D DL subframes and U UL subframes, the D subframes are divided into min(U,D) groups, referred to as bundling windows. For the case with more DL subframe than UL subframes, this means that we have U groups, each group containing the $K_u$ DL subframes which are associated with UL subframe u and are numbered, u=1, 2, ... $K_u$. The numbering may then be restarted for each group of associated DL subframes, i.e. for each bundling window.

The UE will attempt to decode DL assignments in each DL subframe, and can hence keep track of the number of detected DL assignments during the group of DL subframes. For each DL subframe in which it receives a DL assignment it may increase a counter counting how many DL assignments it has received. It can further compare the signalled number of previously scheduled DL subframes and compare it with its counter of received DL subframe. In this way, the UE detects if it has missed any DL assignments.

Then, the mobile terminal, for the case of bundling, take appropriate action, such as sending a NAK for the case that it detects that it has a missed any DL subframe.

An alternative is that the terminal does not send any report at all to the base station. The base station can detect that the terminal did not transmit any feedback at all and conclude that it missed one or more of its assignments. This terminal feedback is then similar to the case that the terminal misses all downlink assignments in a bundling window.

Each DL control channel carrying an assignment in each DL subframes is associated with an ACK/NAK feedback resource on the uplink control channel (PUCCH). The mobile terminal will use the feedback resource of the last correctly detected DL assignment. In case that the UE misses DL assignments following detected assignments, it will use the feedback resource associated with the last detected DL assignment.

The base station may assume that the UE will receive all assignments and will hence first listen to the feedback resource associated with the last DL assignment and detect that nothing was transmitted using this resources, conclude that at least one assignment at the end of the bundling window has been missed, and take appropriate action. It can further back-track to the feedback resource associated with the DL assignment preceding and see whether the UE transmitted something on that resource and so on. This is however an optional step of the base station.

Figure 7:
FIG. 7 shows examples of assigned downlink subframes and signalling of knowledge about previous assigned DL subframes.
Figure 7:
Figure 7:
Figure 7:
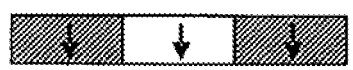
Figure 7:
Figure 7:

An example of the signalling is given in FIG. 7. The number of DL subframes in the bundling window is taken in the illustrated examples as two and three, that is, K=2 and K=3. A striped subframe with an arrow pointing down represents a DL subframe in which the terminal is assigned DL resources. Each assigned DL comprises information of the previously number of subframes with DL assignments k within a DL bundle. That is, a DL subframe with an assignment with k=0 is the first subframe with a DL assignments and an assignment in a DL subframes with k=1 is the second subframe with a DL assignment. Hence, k indicates the number of DL subframes with assignments previously assigned within the DL bundling window.

In the example of three DLs, that is, K=3, the number of previous subframes with DL assignments are indicated with information k, k=0-2, where for example k=2 indicates that two DL subframes have previously comprised DL assignments to the mobile terminal.

Figure 8:
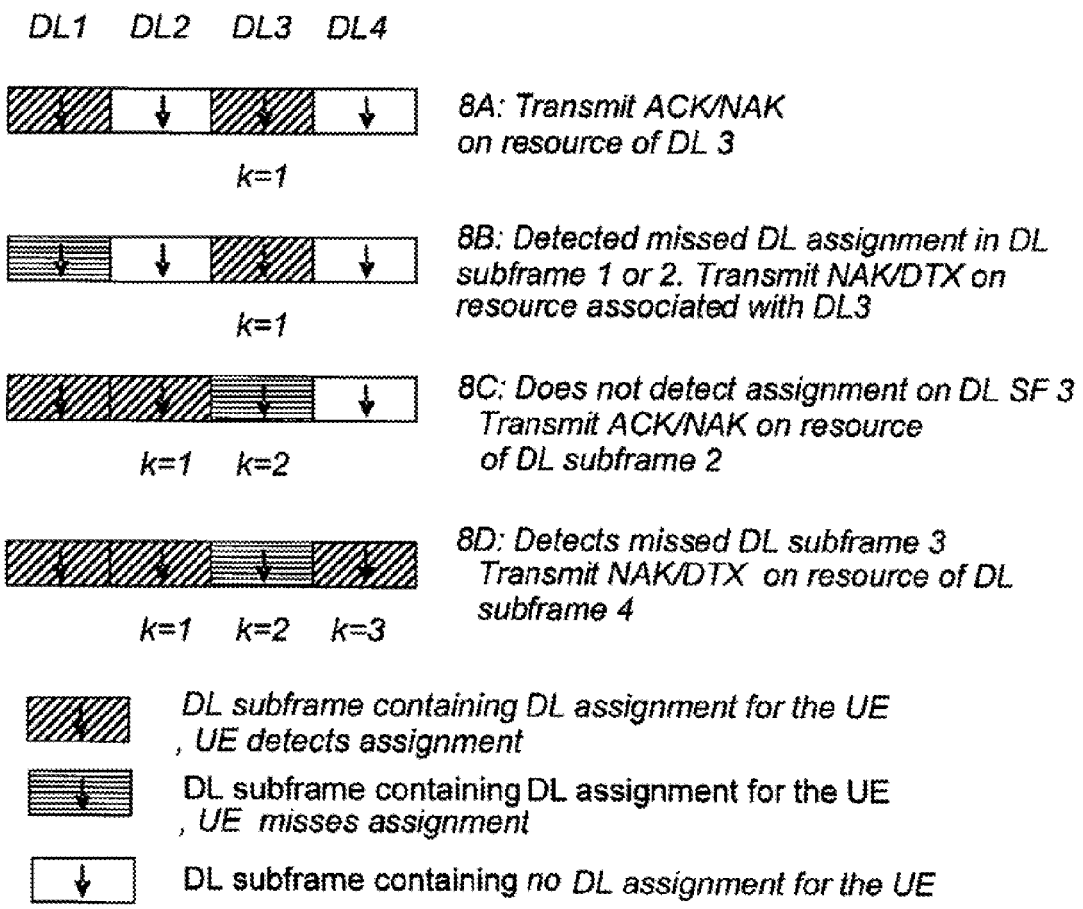
FIG. 8 shows examples of detection of downlink assignments for different assignments.

In FIG. 8 a schematic overview of examples of detection of missed downlink assignments are shown. The downlink assignments are transmitted from a second communication device, such as a base station, an eNodeB or the like, to a first communication device, such as a UE, a terminal or the like. Examples illustrates signaling of previously number of DL subframes with DL assignments for K=4.

A white DL subframe is a subframe containing no assignment for the UE. A diagonal striped DL subframe is a subframe containing DL assignment for the UE, and a subframe the UE has detected an assignment in.

A horizontal striped DL subframe is a subframe containing DL assignment for the UE, and a subframe the UE has not detected any assignment in.

In case 8A, the UE detects assignments in downlink subframes DL1 and DL3. As DL3 is the last received assigned DL, the UE transmit an ACK on the UL resource of DL3. The value of previously assigned DL subframes is in DL3 denoted as k=1. It should here be noted that if the UE detects an error in data in the assigned DL subframes during decoding, the UE transmits a NAK on the UL resource associated with DL3 instead.

In case 8B, the UE misses the assignment in DL1 and only detects the assignment in DL subframe DL3. As the UE reads the k-value that indicates that the DL3 is the second subframe with an assignment, the UE determines that it has missed an assignment in a previous DL subframes and transmits a NAK on the UL resource of DL3 or does not transmit anything at all, a so called discontinuous transmission, DTX. The value of previously assigned DLs is in DL3 denoted as k=1.

In case 8C, the UE detects the assigned downlinks DL1 and DL2. However, the UE misses to detect the assignment in subframe DL3. As DL2 is the last subframe in which the UE detected a DL assignment, the UE transmits an ACK or NAK on the resource of DL2 in the uplink subframe assigned to the bundle and the resource associated with DL2. Then the base station detects that the UE has missed DL3 because the ACK or NAK is received on the UL resource of DL2 and the base station may at least retransmit the data assigned in DL3. It should also here be noted that if the UE detects an error in any of the assigned DL subframes during decoding the UE may transmit a NAK on the UL resource of DL2 instead. The value of previously assigned DLs is in DL2 denoted as k=1 and in DL3 denoted as k=2.

In case 8D, the UE detects the assigned downlinks DL1 and DL2, k=0 and k=1. However, the UE misses to detect the assigned DL3. The UE then detects assigned downlink DL4. As the UE read the value of previously assigned DLs in DL4, denoted as k=3, the UE compares this value to previously received assigned DLs and detects that the values differ, that is, UE expects k=2. That is, the UE has received two previous subframes with DL assignments and the value of DL4 indicates that three DL subframes have previously contained DL assignments to the UE in the bundle of DLs. The UE may then transmit a NAK on the UL resource of DL4 or it may not transmit anything at all, DTX.

The second communication device transmits over the control channel indication of subframes with downlink assignments for a first communication device. By adding indication of number of previous subframes scheduled/assigned with assignments the error detection is improved as the terminal may then detect that it has missed an assignment in a subframe. The indication comprises, for example, the numeral order of downlink subframes such as "this being the third subframe with downlink assignment intended for the first communication device", a number how many previous subframes in a bundling window has contained downlink assignments intended for the first communication device, a Cyclic Redundancy Check, CRC, value indicating the sequence in the bundle, a CRC polynomial indicating the sequence of subframes in the bundle, and/or the like.

A different way to indicate the number of previously scheduled DL subframes is to implicitly signal the number (or position of last scheduled DL subframe) rather than use explicit signalling.

After the downlink control channel is successfully decoded the terminal decodes the assigned resources on Physical Downlink Shared Channel, PDSCH. In order to test if the decoding was successful the UE checks after decoding a CRC, (the CRC is attached prior transmission to a transport block). A successful CRC check indicates with very high likelihood a successful decoding.

The polynomial used to generate the CRC on the physical downlink channel PDSCH is in LTE common to all UEs and cells and is 24 bit long. One possibility to implicitly signal the number of previous subframes with DL assignments (or position of last subframe with a DL assignment) is to use different CRC polynomials for the different number scheduled DL subframes. For example, the first scheduled DL subframe has a CRC generated with polynomial 1 attached to it; the second scheduled DL subframe has a CRC generated with polynomial 2 attached to it, and so on.

It is also possible—and preferable—to use a common CRC polynomial for all subframes but to scramble or mask the calculated CRC with a sequence that depends on the number of previously scheduled subframes (or position of last scheduled subframe). The terminal calculates the CRC with all possible CRC polynomials (or all possible scrambling sequences) and from the CRC polynomial (or scrambling sequence) that successfully checks out the number of previously scheduled subframes (or position of last scheduled subframe) can be derived. Comparing this information with the recently received DL subframes indicates if DL subframes have been missed or not. If a DL subframe has been missed appropriate action can be taken, e.g. sending a NAK in case of ACK/NAK bundling.

It is not necessary to check all CRC polynomials or scrambling sequences for all DL subframes: In DL subframe 1 only one CRC polynomial or scrambling sequence needs to be checked since no previously DL subframes exist, in DL subframe 2 only two CRC polynomials or scrambling sequences must be checked and so on.

Instead of using multiple CRCs on PDSCH it is also possible to apply the same principle to the downlink control PDCCH. Here not the payload but the control information is protected with different CRC polynomials or the calculated CRC is scrambled with different scrambling sequences. However, the CRC sizes used on PDCCH are shorter and the increased likelihood of a false passed CRC check becomes noticeable.

By using implicitly signaling of the number of previously scheduled DL subframes no more extra bits need to be signaled in the downlink control channel, not affecting the coverage.

Figure 9:
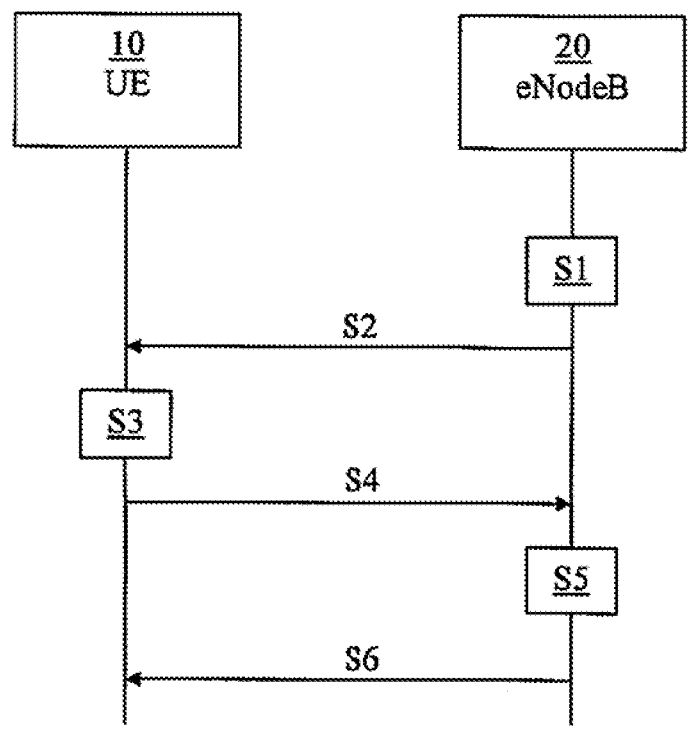
FIG. 9 shows a schematic overview of a combined signaling and method scheme.

FIG. 9 shows a schematic overview of a combined signaling and method scheme transmitting control information between a second communication device and a first communication device.

In the illustrated example, the first communication device comprises a user equipment UE 10 and the second communication device comprises an eNodeB 20.

In step S1, the eNodeB 20 determines whether at least a part of a downlink subframe of a radio frame is to be assigned to the UE 10, that the subframe may be assigned to a UE, and/or that the subframe may be associated with an UL subframe in the same or another radio frame. The determination/scheduling may typically be done on a per subframe basis. The eNodeB 20 and the UE also determines an uplink subframe on which feedback of reception of a plurality of downlink subframes is bundled into a single message and transmitted according to a predefined rule for each uplink downlink configuration.

For each DL subframe within the set of DL subframes, resources are assigned by a scheduler in the eNodeB. The eNodeB then adds an indicator to each downlink subframe sequentially indicating number of subframes with previous DL assignments assigned to the first communication device in the control information In step S2, the eNodeB 20 transmits the radio frame comprising the downlinks with indicators to the UE 10 on a physical downlink channel, for example, shared channel, control channel and/or the like.

Steps S1 and S2 are repeated for each DL subframe within a bundling window.

In step S3, the UE 10 receives the subframes of the radio frame, decodes and analyses the subframes to detect subframes with DL assignments. Since the UE 10 can keep track of the number of detected DL assignments, and is expected to combine the ACK/NAKs resulting from decoding the corresponding transport blocks it is sufficient that the eNodeB 20 provides information to the UE 10 indicating the number of assigned DL subframes 20 within the set of associated DL subframes. More specifically, in each DL assignment, the eNodeB 20 can provide information on the number of previous subframes with DL assignments. By comparing the signalled number of DL assignments with the number of received detected DL assignments typically after the last DL subframe which contained a detected DL assignment, the UE 10 can detect that it has missed one or several assignments. An alternative, with slightly higher overhead, is that eNodeB 20 informs the UE 10 on which DL subframes it has been previously assigned resources.

The history of previous subframes with downlink assignments may be indicated by using consecutive numbers explicitly as part of the control information, different polynomial CRCs, differently scrambled/masked CRC and/or the like.

Furthermore, in step S4, the UE 10 transmits ACK/NAK depending on the decoding and/or the read number of previously assigned DL subframes. If the decoding is successful and the number of previously assigned DL subframes indicates an excepted sequential number, an ACK is transmitted on a resource of the UL subframe. The uplink control channel resource is related to the last DL subframe in which a DL assignment is detected within the plurality of downlink subframes with detected assignments to the UE 10.

However, if the decoding fails and/or the number of previously assigned DL subframes differs from the excepted sequential number, a NAK is transmitted on the resource of the UL subframe or a response is not transmitted at all.

In step S5, the eNodeB 20 receives the feedback ACK/NAK/DTX from the UE 10. The eNodeB 20 checks at least the resource in the uplink related to the last DL subframe with a DL assignment of the plurality of assigned DL subframes.

In step S6, the eNodeB may retransmit data to the UE 10. For example, if ACK is received, the eNodeB 20 continues to transmit new data to the UE 10. If NAK is received, the eNodeB 20 resends the plurality of DL subframes or the radio frame.

If no feedback is received in the resource of the UL related to the last DL subframe assigned to the UE 10, the eNodeB 20 checks the next resource in the UL subframe related to the DL previous the last assigned DL subframe. If the ACK or NAK is received in this resource, the eNodeB knows that the UE 10 merely has missed the last assigned DL subframe and resends only the last DL subframe. If no feedback is received, the eNodeB then checks, similarly, the previous resource of the UL subframe and so on.

Figure 10:
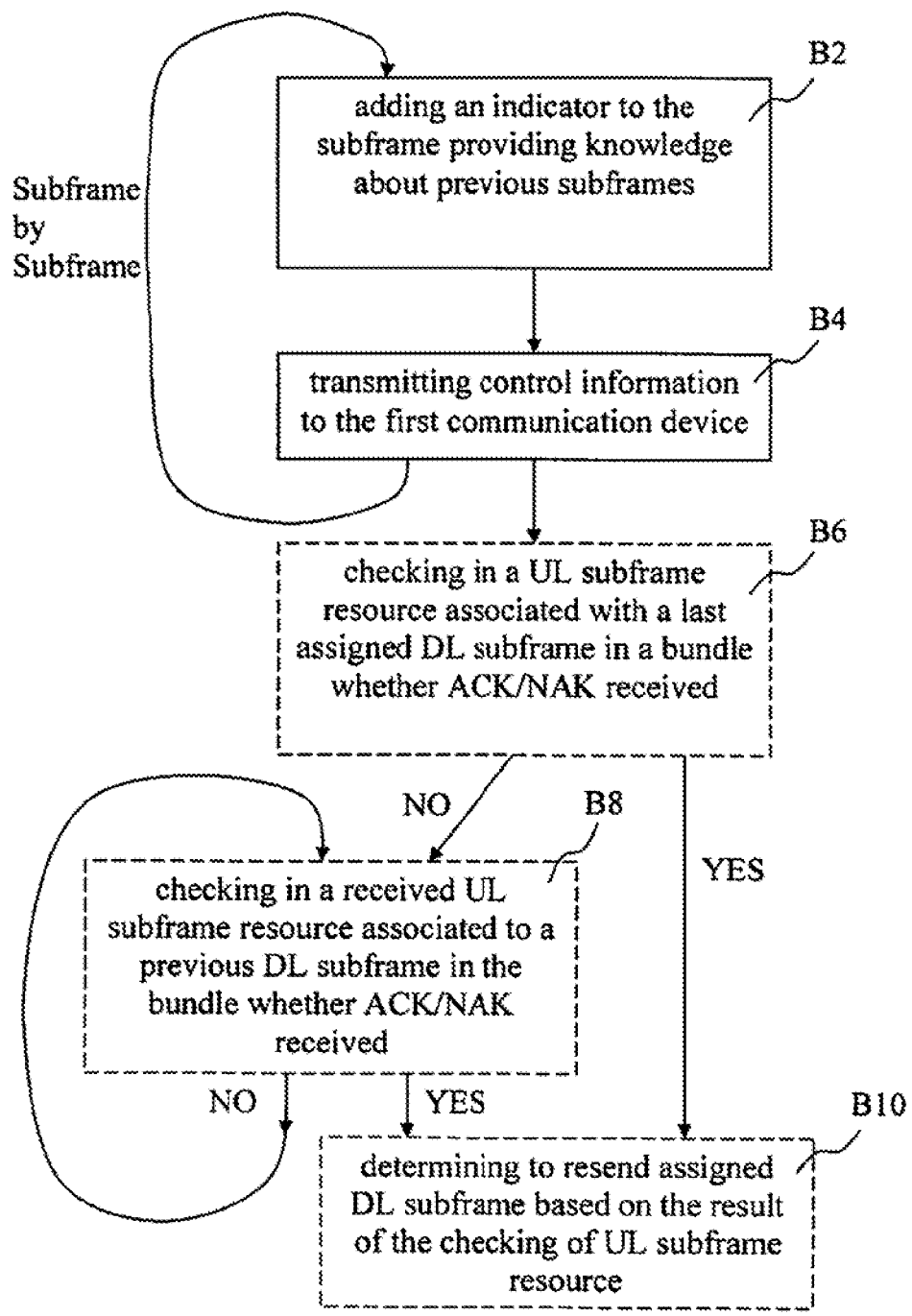
FIG. 10 shows a schematic overview of a method in a second communication device.

In FIG. 10, a schematic overview of a method in a second communication device is shown.

The method is for transmitting control information and data in a subframe with a downlink DL assignment intended for a first communication device. The subframe of a radio frame, which contains at least one downlink subframe, may be sent over a radio channel to the first communication device. The method may be performed repeatedly for each subframe with DL assignment intended for the first communication device.

In step B2, the second communication device adds an indicator to the subframe providing knowledge about previous subframes with a DL assignment intended for the first communication device in the control information. In some embodiments, a bundling window comprising a set of DL subframes associated with a single UL subframe is provided and the subframe is comprised within the bundling window of subframes in the control information.

In some embodiments, the indicator indicates number of previous subframes with DL assignment intended for the first communication device and may comprise at least one bit indicating a numeral reference, such as consecutive numbers and/or the like. For example, the indicator may be a number indicating that the DL subframe is the second assigned DL (ordinal number), denotes the accumulative number of assigned PDSCH transmission with corresponding PDCCH (s) up to the present subframe within the bundling window, a number indicating one previously assigned DL subframes, and/or the like. Thereby, knowledge about previous subframes is provided.

In step B4, the second communication device transmits the control information with the assigned downlink subframe to the first communication device. This may be performed in a per subframe basis.

In some embodiments, the second communication device assigns a plurality of downlink subframes to the first communication device forming a bundling window and feedback of the reception of the plurality of downlink subframes is arranged to be bundled into a single ACK/NAK feedback message at the first communication device.

In optional step B6, the second communication device may then determine that the control information or data has been received or not by checking an uplink resource of an uplink subframe assigned to the plurality of assigned downlink subframes for the single ACK/NAK feedback message feedback of reception. The first uplink resource is related to a last assigned downlink subframe of the plurality of assigned downlink subframes.

In optional step B8, in a case where uplink resource of the last assigned downlink subframe comprises no feedback of reception, the second communication device checks a second uplink resource related to an assigned downlink subframe previous the last assigned downlink subframe for the single ACK/NAK feedback message. This may continued through the plurality of assigned downlink subframes until feedback of reception is detected or no resource of the uplink related to assigned downlink subframes is left.

In some embodiments, if no single ACK/NAK feedback message is detected on the uplink resource, it is determined that at least one downlink assignment has been missed. Hence, if no transmission is detected it may be determined that the control information has not been received.

In some embodiments, an ACK in the single ACK/NAK feedback message indicates properly received control information and a NAK indicates a failed decoded subframe and/or a missed downlink assignment.

An alternative to steps B6 and B8 is that all uplink resources associated with the downlink assignments are checked to determine which resource the first communication node most likely will use, and then checks the ACK/NAK or DTX feedback on this resource.

In optional B10, the second communication device determines to resend assigned downlink subframe based on a result of the checking of the uplink subframe resource. For example, if the second communication device detects that the first communication device has missed the last assigned DL subframe by detecting an ACK in a resource associated to the next to last DL subframe the second communication device resends merely the last assigned DL subframe.

In some embodiments, the indicator indicates which number of the plurality of subframes with a downlink assignment intended for the first communication device the subframe comprises, such as ordinal, accumulative number and/or the like, within the plurality of subframes (bundling window). The numbering may restart in every plurality of subframes (bundling window).

In some embodiments, the indicator indicates number of previous subframes with downlink assignment intended for the first communication device by comprising at least one bit indicating a numeral reference, such as consecutive numbers and/or the like.

In some embodiments, the indicator indicates a subframe number of a previous subframe with assignment intended for the first communication device. In this case, the first communication device may check whether it has received a downlink assignment in the indicated subframe.

In some embodiments, the indicator is arranged as a part of the downlink assignment on the control channel.

In some embodiments, the indicator indicates number of previous subframes with downlink assignment intended for the first communication device by using a polynomial to generate a Cyclic Redundancy Check, CRC, for the assigned subframe on a Physical Downlink Channel, PDCH, such as Physical Downlink Shared Channel, PDSCH, Physical Downlink Control Channel, PDCCH, and/or the like.

In some embodiments, the indicator of previous subframes with downlink assignment intended for the first communication device comprises a cyclic redundancy check value generated from a scramble/mask of a Cyclic Redundancy Check, CRC. The CRC is generated with a polynomial for the assigned subframe on a Physical Downlink Channel, PDCH, such as Physical Downlink Shared Channel, PDSCH, Physical Downlink Control Channel, PDCCH, and/or the like. The scramble/mask depends on the number of previously scheduled assigned subframes and the first communication device retrieves the indicator from decoding the data.

For example, the first scheduled DL subframe has a CRC generated with polynomial 1 attached to it; the second scheduled DL subframe has a CRC generated with polynomial 2 attached to it, and so on. Hence, a receiving device decoding the CRC will know what polynomial that has generated the CRC and, hence, the number of previously assigned DL subframes.

In order to perform the method a second communication device is provided.

Figure 11:
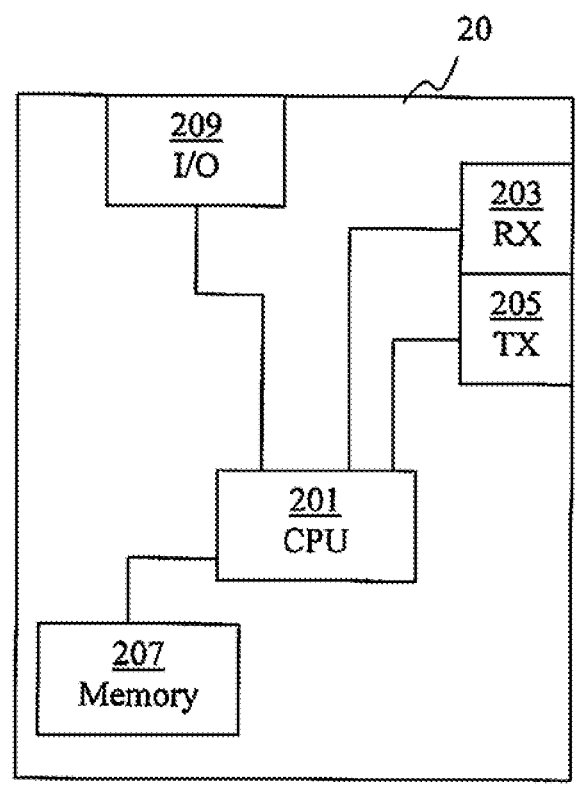
FIG. 11 shows a schematic overview of a second communication device.

In FIG. 11, a schematic overview of a second communication 20 device is shown.

The second communication device may comprise a base station, eNodeB, NodeB, a UE and/or the like.

The second communication device 20 is arranged for transmitting control information and data with a subframe with downlink assignment intended for a first communication device of a radio frame over a radio channel to the first communication device.

The second communication device 20 comprises a control unit 201 arranged to add an indicator to the subframe arranged to provide knowledge of previous subframes with a downlink assignment intended for the first communication device in the control information to the first communication device.

In some embodiments, the indicator may indicate number of previous subframes with downlink assignment intended for the first communication device by comprising at least one bit indicating a numeral reference, such as consecutive numbers and/or the like. The indicator may be an ordinal number such as first second, third and/or the like.

In some embodiments, the indicator may indicate implicitly number of previous subframes with downlink assignment intended for the first communication device. This may be done by using a polynomial to generate a CRC for the assigned subframe on a PDCH, such as PDSCH, PDCCH and/or the like. The indicator of previous subframes assigned to the first communication device may comprise a cyclic redundancy check value generated from a scramble/mask of a polynomial for the assigned subframe on a PDCH, such as PDSCH, PDCCH and/or the like. The scramble/mask depends on the number of previous subframes assigned to the first communication device and thereby implicitly indicates the number of previous subframes assigned to the first communication device.

The second communication device 20 further comprises a transmitting arrangement 205 arranged to transmit the control information and data of the assigned downlink subframe to the first communication device.

In some embodiments, the second communication device comprises a receiving arrangement 203 and one or more radio frames comprise a plurality of downlink subframes assigned to the first communication device. Feedback of the reception of the plurality of downlink subframes is arranged to be bundled into a single ACK/NAK message at the first communication device. Thus, the receiving arrangement (203) is arranged to receive feedback of reception comprising the single ACK/NAK message from the first communication device on a first uplink resource of an uplink subframe assigned to the plurality of assigned downlink subframes. The first uplink resource is related to a last assigned downlink subframe of the plurality of assigned downlink subframes. In some embodiments, the uplink resource of the uplink control channel associated to the last received detected assigned downlink subframe is separated with at least three subframes from the last assigned downlink subframe.

The control unit 201 may then be arranged to determine that the control information and/or data has been received by checking the first uplink resource of an uplink subframe assigned to the plurality of assigned downlink subframes for feedback of reception.

In some embodiments, the control unit 201 is arranged, in a case uplink resource of the last assigned downlink subframe comprises no feedback, to check a second uplink resource related to an assigned downlink subframe previous the last assigned downlink subframe for feedback of reception.

In some embodiments, all uplink resources are checked to determine the resource used.

In some embodiments, the control unit 201 is arranged to determine that a packet has been missed or not been successfully decoded upon the single message comprises a negative acknowledgement, NAK, or not receiving a feedback reception at all.

The control unit 201 may in some embodiments be arranged to determine that at least one packet has been received properly upon the single message comprises a positive acknowledgement, ACK, related to that uplink resource of the at least one packet.

In some embodiments, the second communication device comprises a network interface 209 arranged to transmit and receive data to/from a core network and a memory unit 207 arranged to have applications and data to perform the method stored thereon.

The control unit 201 may comprise a CPU, a single processing unit, a plurality of processing units, and or the like.

The memory unit 207 may comprise a single memory unit, a plurality of memory units, external and/or internal memory units.

Figure 12:
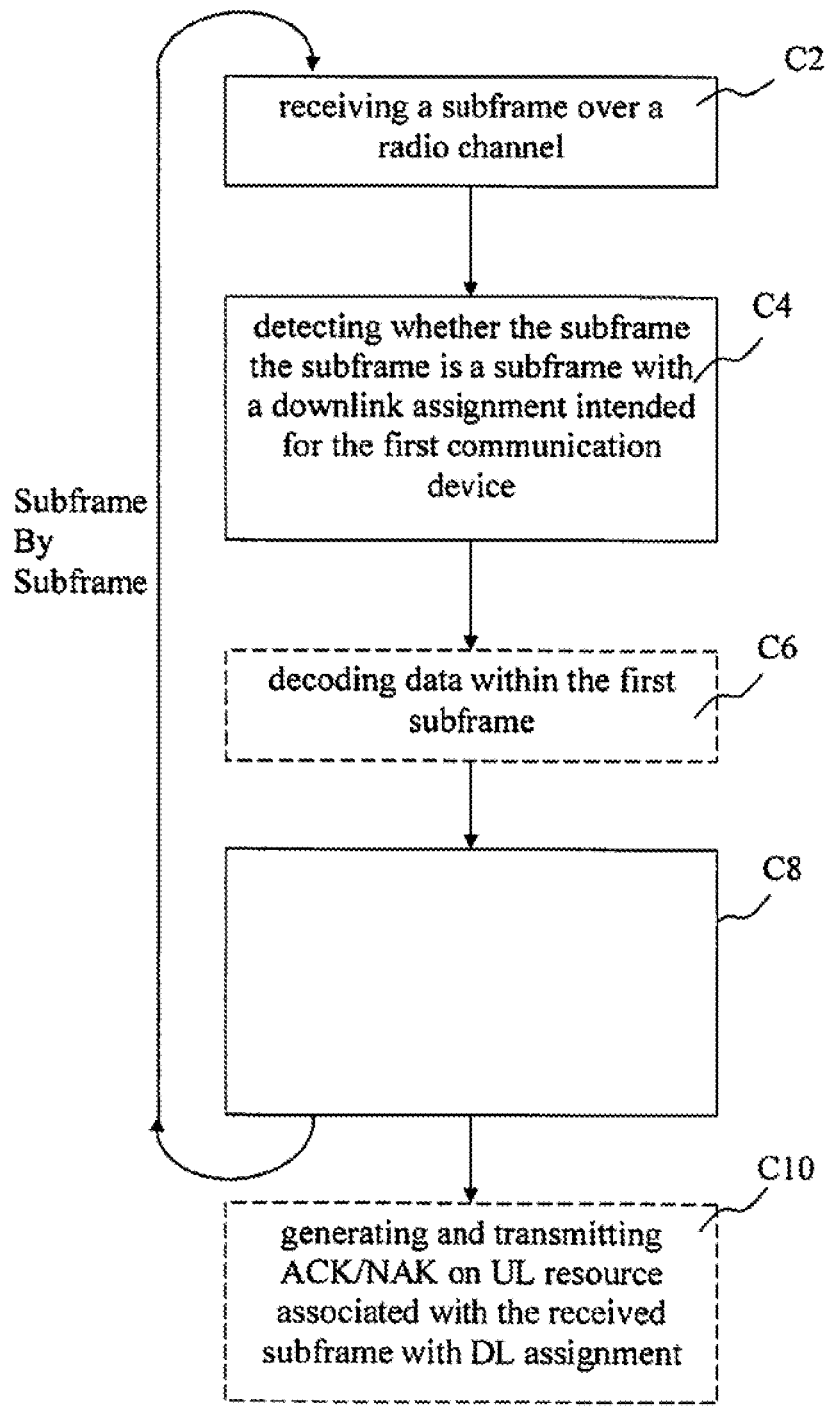
FIG. 12 shows a schematic overview of a method in a first communication device.

In FIG. 12, a schematic overview of a method in a first communication device for receiving control information and data over a radio channel from a second communication device is shown.

In step C2, the first communication device receives at least part of a subframe over the radio channel.

It should be noted that subframes are received one by one and may be processed one by one. In some embodiments, the first communication device receives over time a bundle of DL subframes assigned to the first communication device. In each subframe, both a single assignment (control information) and the data assigned (transport blocks) are received. In some embodiments, the bundle of subframes with assignments intended for the first communication device is associated to a resource of an uplink to be used to confirm the reception/detection of the bundled subframes. Each assignment in each subframes is associated with a control channel resource, the terminal then picks one of these resources.

In step C4, the first communication device detects whether the subframe is a subframe with a downlink assignment intended for the first communication device, for example, by reading control information in the subframe. A subframe that contains a downlink assignment intended for the first communication device means that part of the resources in the present subframe contains data for the first communication device.

In optional step C6, the first communication device decodes the data within the subframe. This step may also be performed after step C8.

In step C8, the first communication device has detected that the subframe comprises a downlink assignment intended for the first communication device and determines whether at least one downlink assignment for data being sent from the second communication device before the subframe has been missed by analysing an indicator associated to the subframe; the indicator providing knowledge about previous downlink subframes with downlink assignments intended for the first communication device.

In some embodiments, the first communication receives a plurality of subframes (subframe by subframe) and detects a plurality of subframes with downlink assignments intended for the first communication device The typical application is bundling and it is in principle sufficient to check whether an assignment has been missed after last subframe in the bundling window. Hence, it is not necessary to check after each received DL subframe for a missed assignments. However, it may be checked after each received DL subframe unless a missed DL subframe has already been detected.

In optional step C10, the first communication device then generates a ACK/NAK feedback of reception in response to the received plurality of detected subframes, wherein the ACK/NAK feedback is bundled into a single bundled ACK/NAK feedback message and transmits the single bundled ACK/NAK feedback message in an uplink resource associated with a last received detected subframe with downlink assignment intended for the first communication device of an uplink subframe associated to the plurality of downlink subframes.

For each DL subframe within a bundling window (bundle of subframes) the first communication device may determine if there is a downlink assignment for the first communication device by reading/decoding one or several control channels.

In some embodiments, the uplink resource of the uplink control channel associated to a last received detected assigned downlink subframe in the radio frame is separated with at least three subframes from the last assigned downlink subframe, to take delay and such into account.

In some embodiments, step C10 is performed in case no downlink assignment is determined to have been missed, and in case at least one downlink assignment is determined to have been missed no feedback is transmitted.

In some embodiments, the single bundled ACK/NAK feedback message comprises a negative acknowledgement, NAK, when decoding of data in at least one received subframe with a detected downlink assignment fails and/or a downlink assignment has been determined to have been missed.

In some embodiments, the single bundled ACK/NAK feedback message comprises a positive acknowledgement, ACK, when the decoding of data in all received subframes with detected downlink assignments is successful and it is determined that the first communication device has not missed any downlink assignments.

In other words, in case no missed assignments, use the resource associated with the last control channel in the last DL subframe with an assignment intended for the first communication device to send an ACK or NAK depending on the results of decoding the transport blocks. Typically an ACK is sent if all transport blocks are correctly decoded and if at least one transport blocks fails, a NAK is sent. In case at least one missed assignment is detected, NAK is generated for all code words so that a bundled NAK is generated (case with feedback on PUSCH) OR no response is transmitted/DTX (case with feedback on PUCCH).

The second communication device will notice whether the confirmation is received at an uplink resource associated to the proper subframe or a different one and thereby determine whether to resend packet/s or not.

Hence, the second communication device will either detect a NAK (if NAK is transmitted) which may be caused by a missed assignment or because of decoding fails. The second communication device may also detect that at least one assignment has been missed if it detects no transmission avoiding the case where a missed assignment leads to an ACK.

It should here be noted that step C6 may be performed after step C8. That is, the decoding of the data may be performed after the determination of missed data intended for the first communication device. Hence, a first communication device that detects that a subframe has been missed does not have to decode data but to merely transmit a NAK or do nothing (DTX).

In some embodiments, the indicator indicates which number of the plurality of subframes with a downlink assignment intended for the first communication device the subframe is, such as ordinal number, an accumulative number and/or the like.

In some embodiments, the indicator indicates number of previous subframes with downlink assignment intended for the first communication device and comprises at least one bit indicating a numeral reference, such as consecutive numbers and/or the like In some embodiments, the indicator is arranged as a part of the downlink assignment on the control channel.

In some embodiments, the indicator indicates number of previous subframes with downlink assignment intended for the first communication device and comprises a polynomial used to generate a Cyclic Redundancy Check, CRC, for the assigned subframe on a Physical Downlink Channel, PDCH, such as Physical Downlink Shared Channel, PDSCH, Physical Downlink Control Channel, PDCCH, and/or the like. The first communication device retrieves this polynomial during the decoding of the data or control information.

In some embodiments, the indicator indicates number of previous subframes with assignment intended for the first communication device and comprises a cyclic redundancy check value generated from a scramble/mask of a Cyclic Redundancy Check, CRC, generated with a polynomial for the assigned subframe on a Physical Downlink Channel, POCH, such as Physical Downlink Shared Channel, PDSCH, Physical Downlink Control Channel, PDCCH, and/or the like. The scramble/mask depends on the number of previous subframes with downlink assignment intended for the first communication device and the first communication device retrieves the indicator from decoding the data or control information.

In some embodiments, the first communication device determines whether a downlink assignment has been missed by comparing the indicator with an expected value of the indicator. The expected value may be generated from a counter and/or the like. For example, if the first communication has received one previously assigned DL subframe the expected value of the number of previously assigned DL subframes is "one" or "being second DL subframe" of the next assigned downlink subframe. The indicator and/or expected value may be an ordinal number, a cardinal number, and/or the like.

By comparing the indicator with the expected value, after each or at least the last subframe within the bundling window, the first communication device detects that at least one or several DL assignments have been missed.

In some embodiments, a plurality of downlink subframes is assigned to the first communication device by the second communication device and feedback of reception of the plurality of downlink subframes is bundled into a single message. Steps C2-C8 may be repeated for each DL subframe within the bundling window. However, step C8 must not be performed after each DL subframe, rather in some embodiments; C8 is performed after the last DL subframe in the bundling window. Hence, in these embodiments, the subframe in steps C2-C6 comprises the last subframe in the bundling window.

In some embodiments, the first communication device determines whether at least one downlink assignment has been missed is done; for at least a last subframe or after each subframe in a bundling window of a plurality of subframes with downlink assignments intended to the first communication.

In some embodiments, the radio channel comprises a time divisional duplex scheme.

In some embodiments, the first communication device stops decoding and/or receiving more subframes within a-bundling window if it is detected that is has missed a subframe with a downlink assignment intended for the first communication device.

In order to perform the method a first communication device is provided.

Figure 13:
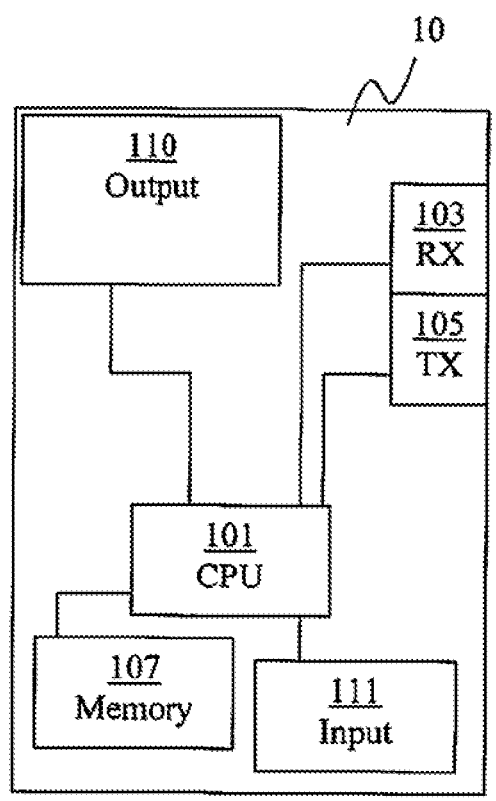
FIG. 13 shows a schematic overview of a first communication device.

In FIG. 13, a schematic overview of a first communication device for receiving control information and data over a radio channel from a second communication device is shown.

The first communication device comprises a receiving arrangement 103 adapted to receive a subframe of a radio frame. The radio frame may comprise at least of one downlink subframe.

The control unit 101 is further arranged to determine whether any downlink assignment for data, that has been scheduled in and sent from the second communication device previous the subframe, has been missed by analysing an indicator associated to the subframe; the indicator is arranged to provide knowledge of previous subframe with downlink assignments intended for the first communication device.

The first communication device further comprises a control unit 101 arranged to determine whether the subframe comprises a downlink assignment intended for the first communication device, for example, by reading control information in the subframe. That being the case, the control unit 101 is further arranged to determine whether at least one downlink assignment for data being sent from the second communication device before the subframe has been missed by analysing an indicator associated to the subframe; the indicator providing knowledge about previous downlink subframes with downlink assignments intended for the first communication device.

In some embodiments, the indicator is arranged to indicate number of previous subframes with DL assignment intended for the first communication device and comprises at least one bit indicating a numeral reference, such as consecutive numbers and/or the like. For example, denotes the accumulative number of assigned PDSCH transmission with corresponding PDCCH(s) up to the present subframe within the subframe.

In some embodiments, the indicator is arranged to indicate number of previous subframes with DL assignment intended for the first communication device and comprises a polynomial used to generate a CRC for the assigned subframe on a PDCH, such as PDSCH, PDCCH and/or the like, and the first communication device is arranged to retrieve the polynomial by decoding of the data.

In some embodiments, the indicator is arranged to indicate number of previous subframes with DL assignment intended for the first communication device and comprises a cyclic redundancy check value generated from a scramble/mask of a polynomial for the assigned subframe on a PDCH, such as PDSCH, PDCCH and/or the like, wherein the scramble/mask depends on the number of previous subframes with assignment intended for the first communication device and the first communication device is arranged to retrieve the indicator by decoding the data.

The control unit 101 may, in some embodiments, wherein a bundling window comprises a plurality of downlink subframes assigned to the first communication device, be arranged to bundle feedback of reception of the plurality of downlink subframes into a single ACK/NAK message. The control unit 101 is then further arranged to transmit over a transmitting arrangement 105, such as an antenna or the like, the single ACK/NAK message, indicating a confirmation that the plurality of downlink subframes has been detected, in an uplink resource. The uplink resource is being associated to a last received detected assigned downlink subframe in the radio frame of an uplink subframe associated to the plurality of downlink subframes. The uplink resource of the uplink control channel associated to the last received detected assigned downlink subframe in the radio frame may in some embodiments be separated with at least three subframes from the last assigned downlink subframe.

In some embodiments, a negative acknowledgement, NAK, is transmitted, when the control unit 101 has failed decoding the data in the last received detected assigned downlink subframe, and/or it has been determined that a packet has been missed. In some embodiments, the first communication device is arranged to omit the transmission to indicate that at least one subframe carrying data need to be retransmitted from the second communication device since at least one downlink assignment has been missed.

In some embodiments, a positive acknowledgement, ACK, is transmitted when the control unit 101 has determined that the decoding has been successful and that the first communication device has received all intended packets in the assigned downlink subframes; "all" according to the first communication device.

In some embodiments, the first communication device comprises a memory unit 107 arranged to store implicit and explicit indicators such as scramble/mask of a polynomial, polynomial, ordinal numbers, cardinal numbers, subframe numbers and/or the like, wherein the control unit 101 is arranged to determine whether any data packet has been missed comprises by comparing the indicator with an expected value of the indicator stored in the memory unit 107. The expected value may be retrieved from a counter arranged in the first communication device counting received subframes with downlink assignments intended for the first communication device.

The control unit 101 may comprise a CPU, a single processing unit, a plurality of processing units, and/or the like.

The memory unit 107 may comprise a single memory unit, a plurality of memory units, external and/or internal memory units.

In some embodiments, the first communication device comprises a user equipment, such as a mobile phone or the like, and the first communication device comprises an input arrangement 111 and an output arrangement 110 to input and output data.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first communication device for receiving control information and data over a radio channel from a second communication device the method comprising the steps of:
   receiving at least part of a subframe over the radio channel;
   detecting that the subframe is a subframe having at least one downlink assignment intended for the first communication device;
   receiving an indicator over the radio channel, the indicator being associated with the subframe and including information about at least one previously transmitted subframe having another at least one downlink assignment intended for the first communication device; and
   analyzing the indicator associated with the subframe for determining whether the another at least one downlink assignment intended for the first communication device has been missed.

2. The method according to claim 1, the receiving step further comprising receiving a plurality of subframes and the detecting step comprising detecting a plurality of subframes with downlink assignments intended for the first communication device, further comprising the steps of:
   generating ACK/NAK feedback of reception in response to the received plurality of detected subframes, wherein the ACK/NAK feedback is bundled into a single bundled ACK/NAK feedback message, and
   transmitting the single bundled ACK/NAK feedback message in an uplink resource associated with a last received detected subframe with downlink assignment intended for the first communication device of an uplink subframe associated to the plurality of downlink subframes.

3. The method according to claim 2, is performed in case no downlink assignment is determined to have been missed, and in case at least if one downlink assignment is determined to have been missed, no feedback is transmitted.

4. The method according to claim 2, wherein the single bundled ACK/NAK feedback message comprises a negative acknowledgement, (NAK,) when decoding of data in one received subframe with a detected downlink assignment fails or a downlink assignment has been determined to have been missed.

5. The method according to claim 2, wherein the single, bundled ACK/NAK feedback message comprises a positive acknowledgement (ACK), when the decoding of data in all received subframes with detected downlink assignments is successful and it is determined that the first communication device has not missed any downlink assignments.

6. The method according to claim 1, wherein the indicator indicates which number of the plurality of subframes with a downlink assignment intended for the first communication device the subframe is, including an ordinal number and an accumulative number.

7. The method according to claim 1, wherein the indicator indicates a number of previous subframes with downlink assignment intended for the first communication device and comprises one bit indicating a numeral reference.

8. The method according to claim 1, wherein the indicator is part of the downlink assignment on a control channel.

9. The method according to claim 1 the indicator indicating a number of previous subframes with assignment intended for the first communication device and comprises a cyclic redundancy check value generated from a scramble/mask of a Cyclic Redundancy Check (CRC) generated with a polynomial for the assigned subframe on a Physical Downlink Channel (PDCH) including Physical Downlink Shared Channel (PDSCH) and Physical Downlink Control Channel (PD-CCH), wherein the scramble/mask depends on the number of previous subframes with downlink assignment intended for the first communication device and the first communication device retrieving the indicator from decoding the data or control information.

10. The method according to claim 1, wherein the determining of whether the one downlink assignment has been missed comprises to compare the indicator with an expected value of the indicator.

11. The method according to claim 1 wherein the step of determining whether the one downlink assignment has been missed is done for a last subframe or after each subframe in a bundling window of a plurality of subframes with downlink assignments intended to the first communication.

12. The method according to claim 1, wherein the first communication device stops decoding or receiving more subframes within a bundling window if it is detected that is has missed a subframe with a downlink assignment intended for the first communication device.

13. A method in a second communication device for transmitting control information and data over a radio channel to a first communication device in a subframe with a downlink assignment intended for the first communication device, the method comprising the steps of:
assigning a plurality of downlink subframes to the first communication device, the plurality of downlink subframes including the subframe with the downlink assignment and a set of subframes previous to the subframe with the downlink assignment;
associating an indicator with the subframe with the downlink assignment, the indicator indicating a number of subframes in the set of previous subframes up to the subframe with the downlink assignment that are also subframes with a downlink assignment intended for the first communication device, thereby indicating to the first communication device whether a downlink assignment in the set of previous subframes was missed, and
transmitting the control information and data with the subframe to the first communication device.

14. The method according to claim 13, wherein feedback of the reception of the plurality of downlink subframes is arranged to be bundled into a single ACK/NAK feedback message at the first communication device the method further comprising the step of
determining whether the control information or data has been received by checking an uplink resource of an uplink subframe assigned to the plurality of assigned downlink subframes for the single ACK/NAK feedback message feedback of reception, wherein the first uplink resource is related to a last assigned downlink subframe of the plurality of assigned downlink subframes.

15. The method according to claim 14, wherein an uplink resource of the last assigned downlink subframe comprises no feedback of reception, checking a second uplink resource related to an assigned downlink subframe before the last assigned downlink subframe for the single ACK/NAK feedback message.

16. The method according to claim 14, wherein if no single ACK/NAK feedback message is detected on the uplink resource, it is determined that one downlink assignment has been missed.

17. The method according to claim 14, wherein ACK in the single ACK/NAK feedback message indicates properly received control information and NAK indicates a failed decoded subframe or a missed downlink assignment.

18. The method according to claim 14, wherein it is determined that one downlink assignment has been missed if no single ACK/NAK feedback message is detected on the uplink resource.

19. The method according to claim 18, further comprising determining to resend assigned a downlink subframe based on a result of the checking of the uplink subframe resource.

20. The method according to claim 14, wherein the number indicated by the indicator includes at least one of an ordinal and an accumulative number.

21. The method according to claim 13, wherein the indicator indicates a number of previous subframes with downlink assignment intended for the first communication device by comprising one bit indicating a numeral reference.

22. The method according to claim 13, wherein the indicator is arranged as a part of the at least one downlink assignment on the control channel.

23. The method according to claim 13, wherein the indicator of previous subframes with assignment intended for the first communication device comprises a cyclic redundancy check value generated from a scramble/mask of a Cyclic Redundancy Check (CRC) generated with a polynomial for the assigned subframe on a Physical Downlink Channel (PDCH) including Physical Downlink Shared Channel (PDSCH), Physical Downlink Control Channel (PDCCH), wherein the scramble/mask depends on the number of previously scheduled assigned subframes.

24. A first communication device for receiving control information and data over a radio channel from a second communication device the first communication device comprising:
a receiving interface adapted to receive a subframe of a radio frame, and
a control unit arranged to determine whether the subframe is a subframe with at least one downlink assignment intended for the first communication device, the control unit being further arranged to
determine whether any downlink assignment for data, that has been scheduled in and sent from the second communication device prior to the subframe, has been missed by analysing an indicator associated with the subframe, the indicator being arranged to provide information of a previous subframe with downlink assignments intended for the first communication device.

25. A second communication device for transmitting control information and data with a subframe comprising a downlink assignment intended for a first communication device of a radio frame over a radio channel to the first communication device, the second communication device comprising:
a control unit arranged to add an indicator to the subframe to provide information of previous subframes with at least one downlink assignment intended for the first communication device in the control information to the first communication device, wherein the indicator indicates the at least one downlink assignment of the previous subframes was missed, and a transmitting interface for transmitting the control information and data with the subframe to the first communication device.

* * * * *

UNITED STATES PATENT AND TRADEMARK OFFICE
CERTIFICATE OF CORRECTION

Page 1 of 2

PATENT NO. : 8,743,721 B2
APPLICATION NO. : 13/251639
DATED : June 3, 2014
INVENTOR(S) : Astely et al.

It is certified that error appears in the above-identified patent and that said Letters Patent is hereby corrected as shown below:

On the Title Page

On Page 2, in Item (56), under "OTHER PUBLICATIONS", in Column 1, Line 26, delete "ACL/NACK" and insert -- ACK/NACK --, therefor.

On Page 2, in Item (56), under "OTHER PUBLICATIONS", in Column 2, Line 44, delete "US" and insert -- UL --, therefor.

In the Specification

In Column 1, Line 17, delete "handing" and insert -- handling --, therefor.

In Column 1, Line 28, delete "(TOD)," and insert -- (TDD), --, therefor.

In Column 3, Line 36, delete "Outout" and insert -- Output --, therefor.

In Column 5, Line 55, delete "example;" and insert -- example, --, therefor.

In Column 10, Line 59, delete "uplink control channel (PUCCH)." and insert -- physical uplink control channel (PUCCH). --, therefor.

In Column 13, Lines 6-7, delete "downlink control PDCCH." and insert -- physical downlink control channel, PDCCH. --, therefor.

In Column 19, Line 50, delete "POCH," and insert -- PDCH, --, therefor.

In Column 20, Line 26, delete "is has" and insert -- it has --, therefor.

Signed and Sealed this
Ninth Day of December, 2014

Michelle K. Lee
*Deputy Director of the United States Patent and Trademark Office*

CERTIFICATE OF CORRECTION (continued)
U.S. Pat. No. 8,743,721 B2

In the Claims

In Column 22, Line 51, in Claim 4, delete "(NAK,)" and insert -- (NAK), --, therefor.

In Column 23, Line 30, in Claim 12, delete "is has" and insert -- it has --, therefor.